Patented Feb. 26, 1952

2,586,885

UNITED STATES PATENT OFFICE 2,586,885

COPOLYMERS OF BETA, GAMMA UNSATURATED ALKENYL ESTERS OF ARYL PHOSPHONIC ACID WITH UNSATURATED ALKYD RESINS

Arthur Dock Fon Toy, Chicago, and Lee V. Brown, Riverdale, Ill., assignors to Victor Chemical Works, a corporation of Illinois No Drawing. Application October 11, 1947, Serial No. 779,418

18 Claims. (Cl. 260—45.4)

This invention relates to copolymers of di beta, gamma, unsaturated alkenyl aryl phosphonates and unsaturated alkyd resins.

Copolymers of di beta, gamma, unsaturated alkenyl aryl phosphonates and unsaturated alkyd resins have been discovered to have non-flammable characteristics and to be hard, tough, solid resins. The new resins are thermo-setting and may be used for forming gels and solutions for use in coating compositions. They may also be used for impregnating glass fibers as well as other fiber in the manufacture of strong laminated products.

The di beta, gamma, unsaturated alkenyl aryl phosphonate may be prepared in accordance with the process shown in A. D. F. Toy, U. S. Patent No. 2,425,765, issued August 19, 1947. The process comprises reacting an aryl phosphorus oxydichloride with a beta, gamma unsaturated alcohol and separating the diester from the reaction mixture. The diesters which have been found most suitable for the present purpose include diallyl phenylphosphonate, dimethallyl phenylphosphonate, diallyl tolylphosphonate, dimethallyl tolylphosphonate, diallyl chlorophenylphosphonate, dimethallyl chlorophenylphosphonate, dicrotyl phenylphosphonate, and the like. These diesters are capable of being polymerized in the presence of heat and a polymerization catalyst to form partially polymerized viscous liquids, gels or solids. They may be used as monomers, or as partially polymerized liquid for copolymerization with the alkyd type compounds. The partially polymerized materials are designated herein as pre-polymers.

The alkyd type materials that may be used are the polyester products of a polyhydroxy alcohol and an unsaturated polycarboxylic acid. These polyester products are designated by the term "unsaturated alkyd resins." They include such products as the di- and triethylene glycol esters of maleic and fumaric acids, and the like.

The unsaturated alkyd resins may be prepared by known methods such as those described by Kropa and Bradley (Ind. Eng. Chem. 31, 1512, (1939)). A few of the unsaturated alkyd resins for use in the examples of the present case were prepared in the following manner.

*Resin No. 1.*—In the preparation of diethylene glycol maleate, 58 grams (0.59 mole) of freshly distilled maleic anhydride was mixed with 62.7 grams (0.59 mole) of redistilled diethylene glycol. The mixture was heated for about twelve hours at 170–175° C. in an atmosphere of carbon dioxide, with agitation being supplied by a bubbling stream of dried $CO_2$ gas. The resulting unsaturated alkyd resin was a light yellow viscous oil having an acid number of eight.

*Resin No. 2.*—Diethylene glycol maleate resin was prepared in a similar manner in the presence of and agitated with dried nitrogen gas. The heating period was about eight hours. The unsaturated alkyd resin product was a viscous water white liquid having an acid number of forty-seven.

*Resin No. 3.*—Diethylene glycol maleate was prepared in the manner for Resin No. 2, except that the heating period was twelve hours. The product was a yellowish viscous liquid with an acid number of thirty-three.

*Resin No. 4.*—Diethylene glycol maleate was prepared in the same manner as Resin No. 2 except that the temperature was maintained at 175–180° C. The product was a water white liquid with an acid number of 25.2.

*Resin No. 5.*—Triethylene glycol maleate was prepared by heating equal molar proportions of triethylene glycol and maleic anhydride for eight hours at 185–190° C. while under agitation with a bubbling stream of dry nitrogen gas. The unsaturated alkyd resin product was a viscous liquid having an acid number of seventeen.

*Resin No. 6.*—Diethylene glycol fumarate-sebacate was prepared by heating a mixture of 297 grams (2.8 moles) of diethylene glycol, 303 grams (1.5 moles) of sebacic acid, and 151 grams (1.3 moles) of fumaric acid for six hours at 195–200° C. under a constant bubbling stream of dry nitrogen gas. The modified unsaturated alkyd resin was a viscous liquid having an acid number of twenty-five.

Mixtures of the di beta, gamma unsaturated alkenyl aryl-phosphonates and the unsaturated alkyd resins will undergo slow copolymerization under the influence of heat, but for practical purposes it is necessary to increase the rate of polymerization by the use of a polymerization catalyst. The organic peroxides are generally satisfactory for this purpose. Suitable catalysts include benzoyl peroxide, acetyl peroxide, t-butyl perbenzoate, and the like. Benzoyl peroxide is generally preferred because of its availability and the ease with which it may be incorporated in the mixtures. The amount of catalyst employed will vary according to the polymerizing conditions used, the rate of degree of polymerization desired, and the temperature employed. The amount required will generally be within the range of 0.1 to 5.0% of the weight of the mixture.

The di beta, gamma unsaturated alkenyl arylphosphonate may be employed with the unsaturated alkyd resins in either its monomeric form or as a partially polymerized "prepolymer." For most purposes it is preferred to use the prepolymer as the mixture is more viscous and more suitable for coating fabrics where thicker films are desired. Further, the prepolymer copolymerizes with the alkyd resin in a shorter period of time at higher temperatures, thus facilitating the manufacture of the finished product.

As a typical example of the preparation of a prepolymer of the di beta, gamma alkenyl arylphosphonate, 1.7 grams (0.22%) of benzoyl peroxide was added to 756 grams of diallyl phenylphosphonate and the mixture heated at approximately 100° C. in an oil bath for two hours and forty minutes, in an atmosphere of nitrogen. A semi-viscous water white liquid was obtained.

The viscous liquid mixture was distilled under vacuum at less than 1 mm. pressure to remove a portion of the unpolymerized monomer. The resulting prepolymer product was a water white viscous residue amounting to approximately 70% of the monomeric starting ester. It had a specific gravity of 1.161 and an index of refraction of $N_D^{25}=1.5303$.

The di beta, gamma, unsaturated alkenyl arylphosphonates and the unsaturated alkyd resins can be copolymerized in all proportions, but from a practical standpoint no apparent advantage is obtained by employing less than 5% by weight of the phosphonate. Increasing the proportion of the phosphonate increases the toughness and flame resistance of the copolymer product. Generally proportions higher than 80% of the phosphonate are unnecessary, and tend to produce characteristics which are generally indistinguishable from polymers of the phosphonate alone.

Conditions for the copolymerization of the mixtures herein disclosed will vary according to the monomer proportions, the degree of prepolymer formation, the nature of the components, the thickness and shape of the desired end product and similar variables. The polymerization reaction is exothermic, and proceeds most rapidly in the early stages of polymerization. In view of this the monomeric mixtures are generally heated and maintained at temperatures of around 50° to 85° C. until the mixture begins to form a solid gel, after which the polymerization may be completed at temperatures up to about 150° C. When employing prepolymer phosphonate components higher initial temperature, up to about 85 to 110° C., may be employed without detriment to the quality of the copolymer products.

The general procedure employed in producing the copolymer products is to mix the di beta, gamma alkenyl arylphosphonate monomer or prepolymer with the desired proportion of the unsaturated alkyd resin, and polymerization catalyst, at room temperature. The mixture may then be poured into molds of the desired shape, or used to impregnate fabrics for the production of laminates with glass fibers, cotton fibers, and other fibrous materials, and the mixture heated at a polymerizing temperature for a sufficient period of time in a non-oxidizing atmosphere to form a clear, hard, tough infusible and insoluble solid resin product.

Typical examples of the production of the copolymer resin products are illustrated in the following tables.

Table 1 shows the copolymerization of diallyl phenylphosphonate monomer with the unsaturated alkyd resin No. 4 (diethylene glycol maleate), using 2% benzoyl peroxide as the catalyst, and heating the mixture at 85° C. for 16 hours in an atmosphere of nitrogen. The mixtures were heated in glass bottles in an oil bath in layers approximately ⅛ to ¼ inch in thickness.

TABLE 1

| Example Number | Diallylphenyl-phosphonate | Resin No. 4 | Resin Product |
|---|---|---|---|
| A-1 | 5 parts (by wt.) | 95 parts (by wt.) | Light amber colored, hard clear solid. Burns moderately. |
| A-2 | 1 part (by wt.) | 7 parts (by wt.) | Hard, clear solid. Burns slowly. |
| A-3 | 1 part (by wt.) | 2 parts (by wt.) | Hard, clear, tough solid. Self-extinguishing. |
| A-4 | 4 parts (by wt.) | 1 part (by wt.) | Do. |

The above examples illustrate the increasing flame resistance of the resin product as the proportion of diallyl phenylphosphonate is increased. The term "self-extinguishing" means that when the resin is ignited in a flame and withdrawn it immediately ceases burning.

The examples in Table 2 illustrate copolymers of the diallyl phenylphosphonate monomer with the unsaturated alkyd resin No. 5 (triethylene glycol maleate). The catalyst and polymerizing conditions were the same as those employed in the tests of Table 1.

TABLE 2

| Example Number | Diallylphenyl-phosphonate | Resin No. 5 | Resin Product |
|---|---|---|---|
| B-1 | 1 pt. (by wt.) | 7 pts. (by wt.) | Hard, clear, yellow solid. Burns moderately. |
| B-2 | 1 pt. (by wt.) | 2 pts. (by wt.) | Hard, tough, clear, yellow solid. Self-extinguishing. |
| B-3 | 4 pts. (by wt.) | 1 pt. (by wt.) | Do. |

Using the same amount of catalyst and polymerizing condition employed in the above examples, copolymer resins of diallyl phenylphosphonate and the unsaturated alkyd resin No. 6 (diethylene glycol fumarate-sebacate) were prepared. These resins are illustrated in Table 3.

TABLE 3

| Example Number | Diallylphenyl-phosphonate | Resin No. 6 | Resin Product |
|---|---|---|---|
| C-1 | 1 pt. (by wt.) | 7 pts. (by wt.) | Clear, leathery solid. Burns slowly. |
| C-2 | 1 pt. (by wt.) | 2 pts. (by wt.) | Do. |
| C-3 | 4 pts. (by wt.) | 1 pt. (by wt.) | Clear, solid, slightly leathery. Self-extinguishing. |

From a commercial standpoint it is desirable that the polymerizing or curing period be as short as possible. Therefore, tests were made at higher polymerizing temperatures, with a heating period of approximately one hour. Results of these tests are shown in the following examples.

*Example D-1.*—Three parts (by weight) of monomeric diallyl phenylphosphonate was mixed with seven parts of the unsaturated alkyd resin No. 2 (diethylene glycol maleate (acid number 47)), and 1.5% of benzoyl peroxide catalyst. The mixture was poured into a glass bottle in a layer approximately one quarter inch in thickness, and the whole heated in an oil bath for one hour at 150° C. The resulting resin product was a self-extinguishing hard, yellow colored solid containing numerous shrinkage cracks.

*Example D-2.*—The test was repeated except that the amount of catalyst was reduced to 1%. The resulting product was a light yellow, hard solid of satisfactory quality.

*Example D-3.*—The test was again repeated using 0.75% of the catalyst and substituting prepolymer diallyl phenylphosphonate instead of the monomer. The resulting product was a hard, tough clear solid of self-extinguishing character, containing only a few minor shrinkage cracks.

*Example D-4.*—The mixture of Example D-3 with the catalyst increased to 1% was heated for ten minutes at 110° C. then for thirty minutes while the temperature was gradually raised to 150° C., and finally heated for twenty-three minutes at 150° C. The resulting resin product was a clear, light yellow, hard, tough solid, without flaws. The product was self-extinguishing.

*Example D-5.*—A mixture of four parts monomeric diallyl phenylphosphonate and six parts of resin No. 2, with 0.9% benzoyl peroxide was heated under the conditions employed in Example D-4. The product was similar in all respects to that obtained in Example D-4.

*Example D-6.*—A mixture of four parts prepolymer diallyl phenylphosphonate and six parts resin No. 2, with 0.9% benzoyl peroxide was heated in an atmosphere of nitrogen for one hour at 150° C., in a layer approximately ⅛" thick. The resin product was a hard, clear, tough solid of self-extinguishing character.

A satisfactory resin product was also obtained when repeating this example with 1.25% of the catalyst.

*Example E-1.*—A fairly hard, clear, light yellow solid resin product was obtained by copolymerizing four parts of monomeric diallyl phenylphosphonate with unsaturated alkyd resin No. 1 (diethylene glycol maleate (acid number 8)), using 0.2% benzoyl peroxide catalyst and heating for one hour at 150° C. in an atmosphere of nitrogen. The product was of self-extinguishing character.

Polymerization of the unsaturated alkyd resin alone under the same conditions gave a soft tacky solid product.

*Example E-2.*—Using the same heating conditions and the same mixture as in E-1, except that the catalyst consisted of 0.75% benzoyl peroxide and 0.50% t-butyl perbenzoate a resin product was obtained which was amber colored, and very hard. It was also of self-extinguishing character.

*Example E-3.*—Repeating the test shown in E-2 except for the use of the prepolymer diallyl phenylphosphonate instead of the monomer, a hard solid resin product of the same character as E-2 was obtained.

*Example E-4.*—Three parts prepolymer diallyl phenylphosphonate, seven parts of resin No. 3 (diethylene glycol maleate (acid number 33)) and 1% benzoyl peroxide were placed in a glass bottle in a layer approximately ⅛" thick, and heated at 110° C. for ten minutes and at 150° C. for thirty-five minutes. A self-extinguishing, light yellow, hard, tough solid resin product was obtained.

*Example E-5.*—The same mixture as used in E-4 was poured into a metal platened mold in ⅛" thickness. The sealed mold was placed in an oil bath at 150° C. for fifteen minutes. The product was a yellow, clear, hard, solid sheet of self-extinguishing character.

The following table shows several copolymerization tests of diallyl phenylphosphonate with the commercial unsaturated polyester type resin "Marco 21-A," "Marco 21-C" (made by the Marco Chemical Co.), and "Laminac No. 4201," (made by the American Cyanamid Company). The table shows the proportions, the catalyst, and polymerizing conditions employed.

TABLE 4

| Example number | Diallyl phenyl-phosphonate | Unsaturated Polyester | Benzoyl Peroxide Catalyst | Heating cycle | Resulting Product |
|---|---|---|---|---|---|
| | | | Percent | | |
| F-1 | 3 parts (monomer). | 7 parts "Marco 21-A." | 3 | In glass tube, under nitrogen. Htd. in oil bath 2 hrs. at 68° C. 16 hrs. at 85° C. | Amber colored, hard, clear, tough solid, self-extinguishing. |
| F-3 | 3 parts (monomer). | 7 parts Laminac No. 4201. | 1.5 | Cast between two cellophane sheets. Heated in air oven. 5 min. at 85° C. 30 min. at 85-130° C.; 25 min. at 130° C. | Hard, clear, solid self-extinguishing. |
| F-4 | 3 parts (prepolymer). | 7 parts Laminac No. 4201. | 1.0 | Cast between two cellophane sheets. Heated in air oven 5 min. at 75-90° C.; 25 min. at 90-120° C. | Do. |

The above examples have illustrated the use of diallyl phenylphosphonate as one component of the copolymer product. In order to illustrate the use of other di beta, gamma unsaturated alkenyl arylphosphonates the following experiments were conducted.

*Example G-1.*—Thirty-five parts of monomeric dimethallyl chlorophenylphosphonate was mixed with sixty-five parts of the unsaturated alkyd resin No. 4 and 2.0% of benzoyl peroxide catalyst. The mixture was poured into a bottle in a layer approximately ⅛" thick in an atmosphere of nitrogen and heated in an oil bath at 85° C. for sixteen hours to complete the copolymerization. The resulting copolymer product was a light yellow, hard, clear solid of self-extinguishing character.

*Example G-2.*—A similar type copolymer product was produced under the same conditions except that dimethallyl phenylphosphonate was substituted for the chlorophenylphosphonate.

*Example G-3.*—A similar resin product was obtained by heating a mixture of thirty-five parts dimethallyl tolylphosphonate and sixty-five parts resin No. 4, with 2% benzoyl peroxide under the same polymerizing conditions.

The copolymer resin products of this invention may be produced in the form of sheets, rods, laminates with various fabrics, or cast in molds of various shapes and sizes. They may be sawed, machined, and polished without difficulty.

The following examples illustrate the production of typical laminated products.

*Example H-1.*—A mixture of forty parts of monomeric diallyl phenylphosphonate, sixty parts of the unsaturated alkyd resin No. 3, and 1% of benzoyl peroxide catalyst, was used to impregnate two plies of filter paper. The impregnated paper was then placed between platens of cellophane stretched over a frame, and then heated in a circulating air oven at 100° C. for one hour to complete the copolymerization. The resulting laminate was a strong, hard, semi-flexible sheet.

*Example H-2.*—A mixture of thirty parts monomeric diallyl phenylphosphonate and seventy parts of the commercial unsaturated alkyd resin Laminac No. 4125 (obtained from American Cyanamid Co.), with 1% benzoyl peroxide catalyst, was gradually heated from 60° to 120° C. over a period of 1½ hours to produce a two ply paper laminate having substantially the same properties as that produced in Example H-1.

*Example H-3.*—A mixture of thirty parts monomeric diallyl phenylphosphonate, seventy parts Laminac No. 4201 (commercial unsaturated alkyd type resin), and 1.5% benzoyl peroxide was used to impregnate two plies of glass cloth. The impregnated glass cloth was cast between platens of cellophane, and heated at 85° C. for five minutes, at 85°–130° C. for thirty minutes and at 130° C. for twenty-five minutes. The finished product was a hard, strong, semi-transparent, fairly flexible laminate sheet.

*Example H-4.*—A mixture of thirty parts of prepolymer diallyl phenylphosphonate, seventy parts of Laminac No. 4201 and 1% benzoyl peroxide was cast in a two ply glass laminate in the manner described in Example H-3. The copolymerization was carried out by heating at 75°–90° C. for five minutes, and at 90°–125° C. for twenty-five minutes. The laminate glass sheet had substantially the same properties as the laminate obtained in Example H-3.

Satisfactory copolymerized resin products may be obtained with various mixtures of the polymerizable components, for example a mixture of fifteen parts diallyl phenylphosphonate, fifteen parts dimethallyl phenylphosphonate was copolymerized with seventy parts of the unsaturated alkyd resin No. 4 in the presence of 2% benzoyl peroxide, by heating at 85° C. for sixteen hours. The product was a clear, light yellow, hard solid of self-extinguishing character.

In another case fifteen parts of dimethallyl phenylphosphonate and fifteen parts of dimethallyl isobutenylphosphonate were copolymerized with alkyd resin No. 4 under the same conditions to produce a similar solid resin product.

Because of the exothermic nature of the polymerizing reaction some care must be exercised in forming thick sections of the copolymer product in order to permit dissipation of the generated heat. This may be handled by carrying out the polymerizing reaction at lower temperatures for longer periods of time. For example, a mixture of thirty parts monomeric diallyl phenylphosphonate, seventy parts of the commercial polyester "Marco 21-A," and 3% benzoyl peroxide was cast in a glass tube mold ⅝" in diameter, and 15" long, lubricated with silicone grease. The mold in an atmosphere of nitrogen was heated for two hours at 68° C. and eighteen hours at 85° C. The resulting copolymer product was a hard, strong, clear rod, free from flaws. It was of self-extinguishing character.

The outstanding advantage in the use of the phosphonate type esters may be shown by comparing the self-extinguishing character of the above described resin products with known resin products made by copolymerizing triallyl phosphate and an unsaturated alkyd (diethylene glycol maleate). For example, mixtures of triallyl phosphate and diethylene glycol maleate in proportions of one to nine, three to seven, five to five, seven to three and nine to one were mixed with 0.2 benzoyl peroxide catalyst and heated in an atmosphere of nitrogen for two hours at 60° C. and eighteen hours at 85° C. In all cases the solid resin products burned very readily and were not self-extinguishing.

Another advantage in the use of, for example, diallyl phenylphosphonate instead of triallyl phosphate is due to the higher thermal stability of the phosphonates. For example, triallyl phosphate has a decomposition point much lower than diallyl phenylphosphonate which is stable at temperatures above 160° C.

In all of the examples the ratios are expressed in parts by weight.

All of the above resin products are insoluble and unaffected by water, ethanol, ethyl ether, carbon tetrachloride, benzene, petroleum naphtha, butyl acetate, 5% hydrochloric acid solution and 5% sodium hydroxide solutions in twenty-four hours at room temperature.

Having described our invention in considerable detail as related to many embodiments of the same, it is our intention that the invention be not limited by any of the details of description unless otherwise specified but rather be construed broadly within its spirit and scope as set out in the accompanying claims.

We claim:

1. A resin product obtained by copolymerizing three parts by weight of diallyl phenylphosphonate and seven parts of diethylene glycol maleate in the presence of about 1.5% by weight of reactants of benzoyl peroxide, said resin product being self-extinguishing to burning.

2. A resin product obtained by copolymerizing 3.5 parts by weight of dimethallyl chlorophenylphosphonate and 6.5 parts of diethylene glycol maleate in the presence of about 2.0% by weight of the reactants of benzoyl peroxide, said resin product being self-extinguishing to burning.

3. A resin product obtained by copolymerizing 3.5 parts by weight of dimethallyl phenylphosphonate and 6.5 parts of diethylene glycol maleate in the presence of about 2.0% by weight of the reactants of benzoyl peroxide, said resin product being self-extinguishing to burning.

4. A resin product obtained by copolymerizing 3.5 parts by weight of dimethallyl tolylphosphonate and 6.5 parts of diethylene glycol maleate in the presence of about 2.0% by weight of the reactants of benzoyl peroxide, said resin product being self-extinguishing to burning.

5. A resin product obtained by copolymerizing four parts by weight of diallyl phenylphosphonate and one part of diethylene glycol fumarate-sebacate in the presence of about 2% by weight of the reactants of benzoyl peroxide, said resin product being self-extinguishing to burning.

6. The product of claim 13 wherein the arylphosphonate is diallyl phenylphosphonate.

7. The product of claim 13 wherein the arylphosphonate is dimethallyl phenylphosphonate.

8. The product of claim 13 wherein the arylphosphonate is dimethallyl tolylphosphonate.

9. The product of claim 13 wherein the alkyd resin is substantially a diethylene glycol maleate.

10. The product of claim 13 wherein the alkyd resin is substantially a diethylene glycol fumarate.

11. The product of claim 13 wherein the alkyd resin is substantially a diethylene glycol fumarate-sebacate.

12. The product of claim 13 wherein the ratio of the phosphonate to the alkyd resin is between 33 to 67 and 80 to 20 parts by weight.

13. A resin product obtained by copolymerizing from about 5 to 80 parts by weight of a di beta, gamma unsaturated alkenyl arylphosphonate wherein the alkenyl group is a member of the class consisting of allyl and methallyl groups and the aryl radical is a member of the class consisting of phenyl, tolyl and chlorophenyl radicals, and from 95 to 20 parts of an unsaturated alkyd resin comprising the reaction product of a polyhydroxy alcohol and an alpha, beta unsaturated polycarboxylic acid wherein said reaction product has an acid number of less than 50, said resin product being flame resistant.

14. A resin product obtained by copolymerizing about 33 to 80 parts by weight of diallyl phenylphosphonate and 67 to 20 parts diethylene glycol maleate, said resin product being flame resistant.

15. A composition of matter comprising a laminated fibrous material impregnated with a resin product obtained by copolymerizing from about 5 to 80 parts by weight of a di beta, gamma unsaturated alkenyl arylphosphonate wherein the alkenyl group is a member of the class consisting of allyl and methallyl groups and the aryl radical is a member of the class consisting of phenyl, tolyl and chlorophenyl radicals, and from 95 to 20 parts of an unsaturated alkyd resin comprising the reaction product of a polyhydroxy alcohol and an alpha, beta unsaturated polycarboxylic acid wherein said reaction product has an acid number of less than 50, said resin product being flame resistant.

16. A composition of matter comprising a laminated fibrous material impregnated with a resin product obtained by copolymerizing about 33 to 80 parts by weight of diallyl phenylphosphonate and 67 to 20 parts diethylene glycol maleate, said resin product being flame resistant.

17. A resin product obtained by copolymerizing from about 5 to 80 parts by weight of a di beta, gamma unsaturated alkenyl arylphosphonate wherein the alkenyl group is a member of the class consisting of allyl and methallyl groups and the aryl radical is a member of the class consisting of phenyl, tolyl and chlorophenyl radicals, and from 95 to 20 parts of an unsaturated alkyd resin selected from the class consisting of diethylene glycol maleate, triethylene glycol maleate, and diethylene glycol fumarate-sebacate.

18. A resin product obtained by copolymerizing 5 to 80 parts by weight of diallyl phenylphosphonate and 95 to 20 parts of diethylene glycol maleate in the presence of 0.1 to 5.0% by weight of the reactants of benzoyl peroxide.

ARTHUR DOCK FON TOY.
LEE V. BROWN.

REFERENCES CITED

The following references are of record in the file of this patent:

UNITED STATES PATENTS

| Number | Name | Date |
| --- | --- | --- |
| 2,409,633 | Kropa | Oct. 22, 1946 |
| 2,425,765 | Toy | Aug. 19, 1947 |
| 2,443,740 | Kropa | June 22, 1948 |
| 2,453,167 | Toy | Nov. 9, 1948 |
| 2,453,168 | Toy | Nov. 9, 1948 |
| 2,497,637 | Toy | Feb. 14, 1950 |

OTHER REFERENCES

Warren, p. 39, "Plastics" (of Chicago), July 1947.